US006776837B2

(12) United States Patent
Wagh et al.

(10) Patent No.: US 6,776,837 B2
(45) Date of Patent: Aug. 17, 2004

(54) FORMATION OF CHEMICALLY BONDED CERAMICS WITH MAGNESIUM DIHYDROGEN PHOSPHATE BINDER

(75) Inventors: Arun S. Wagh, Orland Park, IL (US); Seung-Young Jeong, Lisle, IL (US)

(73) Assignee: The University of Chicago, Chicago, IL (US)

( * ) Notice: Subject to any disclaimer, the term of this patent is extended or adjusted under 35 U.S.C. 154(b) by 225 days.

(21) Appl. No.: 10/012,839

(22) Filed: Nov. 30, 2001

(65) Prior Publication Data

US 2003/0092554 A1 May 15, 2003

(51) Int. Cl.[7] .............................................. C04B 12/02
(52) U.S. Cl. ...................... 106/690; 106/691; 501/111; 501/155; 588/3; 588/4; 588/10; 588/18; 588/252; 588/256; 588/257
(58) Field of Search .................................. 106/690, 691; 501/111, 155; 588/3, 4, 10, 18, 252, 256, 257

(56) References Cited

U.S. PATENT DOCUMENTS 5,645,518 A * 7/1997 Wagh et al. ................. 588/252
6,133,498 A * 10/2000 Singh et al. .................... 588/3

* cited by examiner

Primary Examiner—Paul Marcantoni
(74) Attorney, Agent, or Firm—Cherskov & Flaynik

(57) ABSTRACT

A new method for combining magnesium oxide, MgO, and magnesium dihydrogen phosphate to form an inexpensive compactible ceramic to stabilize very low solubility metal oxides, ashes, swarfs, and other iron or metal-based additives, to create products and waste forms which can be poured or dye cast, and to reinforce and strengthen the ceramics formed by the addition of fibers to the initial ceramic mixture.

21 Claims, 8 Drawing Sheets

FORMATION OF CHEMICALLY BONDED CERAMICS WITH MAGNESIUM DIHYDROGEN PHOSPHATE BINDER

CONTRACTUAL ORIGIN OF INVENTION

The United States Government has rights in this invention pursuant to Contract No. W-31-109-ENG-38 between the U.S. Department of Energy and the University of Chicago, representing Argonne National Laboratory.

BACKGROUND OF THE INVENTION

1. Field of the Invention

The invention relates to a method for forming compactible ceramics and for forming ceramics with improved compression, flexural and fracture strength, and more specifically, this invention relates to a method for using a phosphate binder with enhanced binding characteristics in high waste loading scenarios which is compatible in the paste stage and which can be used with fibers to improve the ceramics' strength.

2. Background of the Invention

The effective sequestration and disposition of waste oils, bulky waste forms and other unwieldy objects continues to elude disposal researchers. Typical concretes and ceramics, the later of which are described in U.S. Pat. Nos. 5,846,894, 5,830,815, 5,645,518, and 6,204,214, and incorporated herein by reference, have high compression strengths. However, these materials exhibit comparatively poor flexural and fracture properties. This leads to crack propagation, particularly when attempting to macroencapsulate large-size objects. Compactibility of these materials also is lacking.

To macroencapsulate large-size objects, better fracture toughness is needed to avoid crack propagation. For cementing lateral junctures in multilateral oil well completions, improved flexural strength is needed. To arrest surface crack propagation, fiber reinforcement is needed.

The use of glass fiber as a strengthening additive in cement causes problems. Cement is very alkaline and glass fibers deteriorate in such alkaline environments. This leads to weakening of the composite structure. Some common solutions are to over-engineer the composite to compensate for the eventual degradation and loss of strength, to use alkali resistant glass fibers, and to use coatings such as polyvinyl chloride (PVC) over the glass fiber to protect it from the alkaline environment. All of these solutions lead to higher costs.

Ceramic systems leading to highly ductile waste forms remain elusive. For example, in the ceramic formation reaction disclosed in U.S. Pat. No. 5,830,815, and given by Equation 1, infra.

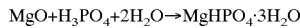

$$MgO+H_3PO_4+2H_2O \rightarrow MgHPO_4 \cdot 3H_2O \qquad \text{Eq. 1}$$

102.44 Kilojoules per mole of heat are released. This high amount of heat results in too rapid ceramic product formation (leading to brittleness) for any practical use. Also, some materials for disposal prove too soluble in the very low pH environs in which the phosphate ceramics disclosed in the '815 patent operate. Alternatively, solids of low solubility ($pK_s$~15 to 25) are not soluble enough in the solutions utilized in the '815 patent.

U.S. Pat. No. 5,846,894 issued to Singh et al. on Dec. 8, 1998 discloses a method to produce phosphate bonded structural products from high volume benign wastes.

U.S. Pat. No. 5,678,234 issued to Colombo, et al. on Oct. 14, 1997 discloses an encapsulation method utilizing a modified sulfur cement at elevated temperatures, and glass or other fibers for enhancement of the compressive and tensile strength.

None of the aforementioned patents teaches a method for the reduction of volume during stabilization of solid powdered wastes. In addition, none of these patents provides a method for the stabilization of near insoluble oxides.

None of the aforementioned patents teaches a method for enhancing the flexural and fracture toughness of the structural products via a truly homogeneous ceramic-fiber composite.

None of the aforementioned patents even contemplates using a dispersant for fiber additives for strength enhancement.

A need exists in the art for a method to produce superior compactible structural products with enhanced flexural and fracture toughness. The method should result in a ceramic which can be compressed while it is still putty-like, i.e., before it sets completely. The method also should result in the formation of a durable and chemically stable ceramic which can be utilized to sequester hard-to-contain wastes. Finally, the method should utilize inexpensive and commonly available reactants at ambient temperatures to produce low cost ceramics.

SUMMARY OF INVENTION

An object of the present invention is to provide a method for producing chemically bonded phosphate ceramics (CBPCs) that overcomes many of the disadvantages of the prior art.

Another object of the present invention is to provide a ceramic capable of encapsulating very low solubility metal oxides. A feature of the invention is that the oxides do not need to be calcined prior to encapsulation. An advantage is that an encapsulation process utilizing a ceramic uses much less energy and, accordingly, is less expensive.

Still another object of the present invention to provide a method for producing ceramics which have enhanced flexural and fracture toughness. A feature of the invention is that fibers being evenly dispersed throughout the ceramic binder enhances the flexural and fracture toughness of the binder. An advantage of this feature is that it minimizes leakage of encapsulated hazardous wastes.

Yet another object of the present invention is to provide a method for producing ceramics which can encapsulate wastes that contain nonpolar, or oil-based fluids. A feature of this invention is that a magnesium dihydrogen phosphate (MHP)-based binder can effectively encapsulate wastes having trace amounts of oil. An advantage of this feature is that, at present, there is not any effective means for encapsulating petroleum fluid-tainted wastes.

Another object of the present invention is to provide a method for producing glass fiber-reinforced ceramics. A feature of the invention is that phosphate-based ceramics are homogeneously mixed with the fibers to produce a ceramic structure containing fibers dispersed throughout the structure. An advantage of the method is that it provides an acidic- to neutral-pH environ favorable to the glass fibers. Therefore, corrosion of the glass fibers is minimized, and structural integrity of the resulting structures is maximized for periods of time heretofore not attainable.

Still another object of the present invention is to provide a method for the effective dispersal of fiber additives in a ceramic binder. A feature of the invention is that monopotassium phosphate is utilized as a dispersant to prevent aggregation of fibers into strands and bunches. An advantage of this feature is that the flexural strength of the resulting structure is typically twice that of cements.

Yet another object of the present invention is to provide a method which produces compactible ceramics. A feature of the invention is the use of magnesium dihydrogen phosphate as a binder. An advantage of the method is that it allows for compression of the ceramic to a volume 40% less than the starting volume of the reaction slurry.

Briefly, the invention provides a room temperature process for producing a compactible ceramic from powders, the process comprising combining MgO and magnesium dihydrogen phosphate dihydrate to create a dry homogeneous mixture; and contacting the mixture with water to form a slurry.

Also provided is a process for strengthening phosphate ceramics, the process comprising adding fibers to the initial ceramic mixture to create a homogeneous composite substrate.

BRIEF DESCRIPTION OF THE DRAWING

The invention together with the above and other objects and advantages will be best understood from the following detailed description of the preferred embodiment of the invention shown in the accompanying drawing, wherein.

DETAILED DESCRIPTION OF THE INVENTION

Figure 1:
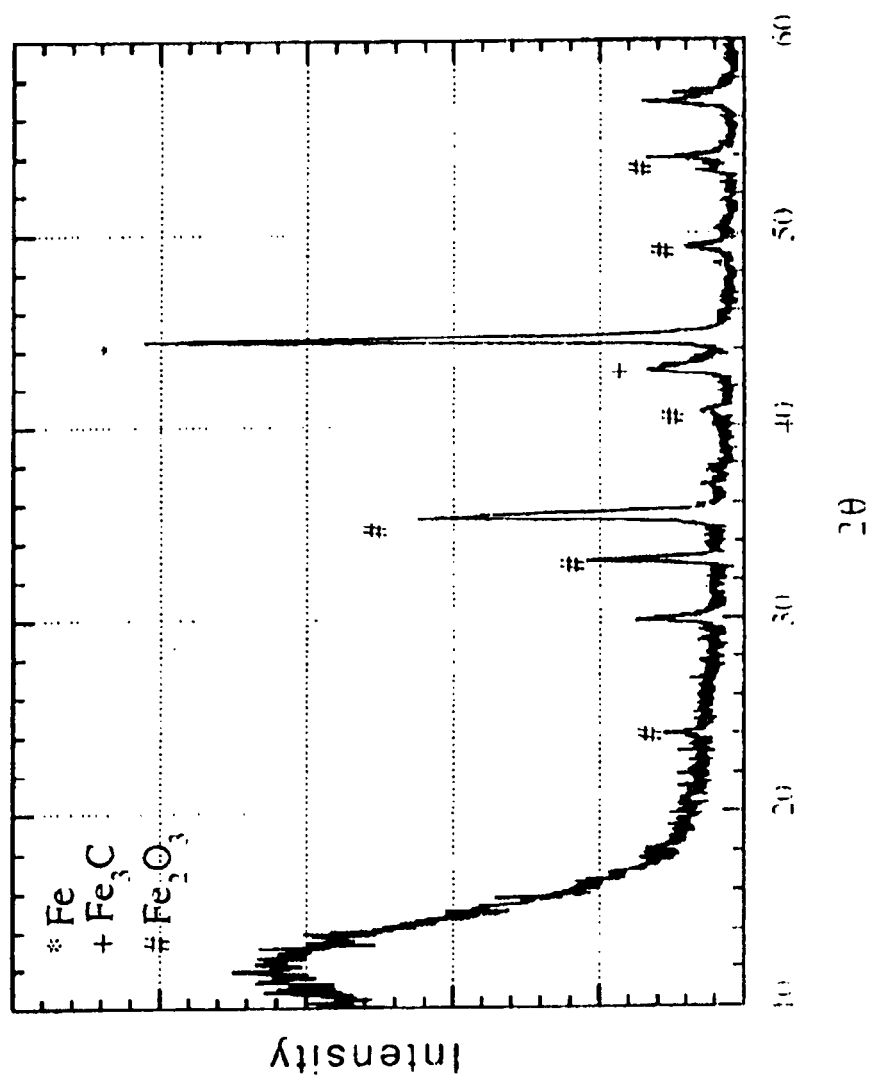
FIG. 1. is a schematic representation of the X-ray diffraction of a swarf before encapsulation, in accordance with features of the present invention.

A process is provided to facilitate macro-encapsulation of bulk-waste, oil waste, and similar unwieldy types of waste forms using ceramic materials and fiber-enforced ceramic materials. The same compactible phosphate binder may be used in "neat" formulations to make ceramics.

The inventors also have developed a ceramic-based waste binder for utilization with compaction technologies. Use of the binder in a compaction mode also accommodates very high waste loadings. The binder has enhanced binding characteristics which allow treatment of more difficult wastes such as those containing oils.

The invented method and binder enable the production of structural products such as conventional bricks and blocks and at lower costs than typical processes and materials.

The inventors have determined that phosphate-based ceramics, such as magnesium dihydrogen phosphate (MHP), homogeneously mixed with reinforcing fibers form compactible, high strength waste sequestration matrices. The phosphate ceramics utilized in the reinforcing fiber-encapsulation method include, but are not limited to magnesium potassium phosphate hexahydrate, magnesium ammonium phosphate, magnesium sodium phosphate, magnesium phosphate, aluminum phosphate, iron phosphate, zinc phosphate, and phosphates of all rare earths such as, but not limited to, phosphates of lanthanum, cerium, yttrium, and neodymium.

The resulting ceramics have wide-ranging utility, including the ability to encapsulate metal wastes that require a more durable ceramic which will withstand the shock of impacts and will not crack over time. Such metal wastes include hazardous materials (e.g. chromium and arsenic), and fission products such as technetium wastes and low-level radioactive materials. Low-level radioactive materials suitable fro encapsulation in the instant ceramic include pyrophoric uranium chips that are stored in mineral oils. It is these oil-tainted materials cannot be easily encapsulated using state-of-the-art technology.

The general process for formulating the ceramic starting material comprises mixing MgO, and magnesium dihydrogen phosphate dihydrate (MHP) to produce a dry mixture; and then combining the mixture with water at room temperature to produce Newberyite, $MgHPO_4 \cdot 3H_2O$. That reaction is illustrated in Equation 2, infra.

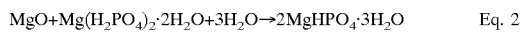

$$MgO + Mg(H_2PO_4)_2 \cdot 2H_2O + 3H_2O \rightarrow 2MgHPO_4 \cdot 3H_2O \qquad \text{Eq. 2}$$

MHP can be produced by reacting MgO and phosphoric acid according to Equation 3:

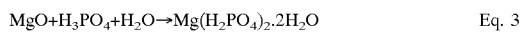

$$MgO + H_3PO_4 + H_2O \rightarrow Mg(H_2PO_4)_2 \cdot 2H_2O \qquad \text{Eq. 3}$$

Both reactions given by Eqs. 2 and 3 are exothermic and produce 56.5 and 108.07 Kilojoules of energy per mole, respectively. As such, the addition of heat is not necessary to produce the binder or resulting composite.

The magnesium oxide, MgO (calcined), and MHP are present in a molar ratio of MgO to MHP which varies from 3:7 to 1:1. An equimolar mixture of MgO and MHP is the preferred mode used in all MHP binder work mentioned herein. The MgO/MHP mixture to water weight ratio varies from 10:1.85 (stoichiometric composition) to 10:3.7. The inventors found that MgO should be calcined as described in U.S. Pat. No. 6,204,214, issued to Singh, et al. on Mar. 20, 2001 incorporated herein by reference, as the preferred mode for the instant invention.

Crystalline MHP is made by mixing 16 wt. % of MgO, 77 wt. % of $H_3PO_4$, and 7 wt. % $H_2O$. Those weight percentages reflect the stoichiometry of the reaction. Only the MgO can be added in excess. The $H_3PO_4$ is dissolved in water with subsequent slow addition of the MgO. The MgO must be added slowly as the reaction is very exothermic and to maintain a temperature increase of approximately 5–10° C. from the ambient temperature.

The mixture described supra, without the addition of any other materials (i.e., "neat MHP), provides a compactible and durable ceramic. The fiber enhanced ceramic made with the MHP process is also compactible.

Waste Detail

For optimal utility, the MHP binder mixture is loaded with any one of a myriad of waste powders derived from high volume wastes. These wastes include, but are not limited to, the group consisting of any inorganic oxides and metals, such as hazardous and radioactive wastes, low solubility metal oxides, ceramic powders, ashes, red mud, sand, swarfs, lateritic soils, mineral wastes, and the same with traces of oils or greases, or combinations thereof. The waste powder loading into the ceramic mixture comprises up to 85 wt. % of the final ceramic.

The hazardous and radioactive waste is material selected from the group consisting of high level radioactive wastes, low-level radioactive wastes, low-level radioactive and hazardous waste called "mixed waste," heavy metals, fission products, uranium and any other radioactive and pyrophoric metals stored in mineral oil, or combinations thereof. Aside from products tainted with mineral oil, other oils or greases also can be accommodated by the instant binder, including petroleum-based or vegetable-based nonpolar compounds, and any other hydrocarbons.

The low solubility metal oxides ($pK_{sp}$ in the range of ~15 to 25) as waste encapsulation candidates include, but are not limited to, oxides of cobalt, copper, dysprosium, erbium, europium, holmium, neodymium, palladium, samarium, tellurium, ytterbium, yttrium, and zinc.

The inventors found that the MHP formulations can be compacted or compressed to a smaller volume as much as 40% of the original volume. The slurry is compacted at temperatures between 0 and 30° C. Compression process temperatures above 30° C. cause the formulation to lose water by evaporation and the ceramic loses strength. Compaction methods employed can include, but are not limited to, uniaxial presses, harmonic presses, adobe presses, and cold or hot isostatic presses. The ceramic mixture also facilitates dye casting.

Monopotassium phosphate can be used as the sole initial phosphate reactant to produce a ceramic mixture. Alternatively, monopotassium phosphate can be added to any initial phosphate binder-waste mixture up to 20 wt. % of the initial mixture as a dispersant.

Fiber Detail

The phosphate-based ceramic systems utilized herein have acidic to neutral environments. Those pH ranges are favorable for glass fibers which deteriorate in environments of high alkalinity (i.e., high pH), as noted supra. As such, the inventors have found that the alkaline degradation problem of glass fiber in concrete systems, is resolved when cement is supplanted by ceramic material, and particularly low-pH ceramic formation systems.

Glass has a very low solubility in moderately acidic and neutral environments. The invented ceramic paste, of the type derived from equation 3, has an initial pH of 4.3, and when setting is complete, it has a pH of 8. This is much lower than the pH of cement, which is typically 12 to 13.

Fibers are added to the initial binder mixture to reinforce phosphate-based ceramics and arrest cracks and crack propagation. The addition of fibers increases the flexural strength up to 2000 psi and the fracture toughness up to 0.8 Megapascal·√meter ($Mpa \cdot m^{1/2}$). The compressive strength of the product is up to five times that of conventional bricks and blocks for which the compressive strength is 2000 psi.

To effectively enhance the strength characteristics of the ceramicrete, the fibers are dispersed evenly throughout the ceramic binder to create a composite mixture that is homogenous throughout. The inventors found that monopotassium phosphate is a good dispersant of cut fibers. This is advantageous in that fibers can be added as bunches and strands, or any combination thereof, but they disperse throughout the binder to be encapsulated as individual fibers by MKP. Monopotassium phosphate can be added to any initial phosphate binder-waste mixture as a dispersant up to 10 wt. % of the initial mixture of any phosphate binder.

Fibers are comprised of materials selected from the group consisting of ceramics, glass fibers, organic polymers, carbon, metal fibers, and natural substances. Fibers come from natural substances selected from the group consisting of coconut, corn, bagasse, jute, sisal, wood, and any cellulosic material. Polymers are organic compounds selected from the group consisting of nylon, polyethylene, polypropylene, and polyvinyl chloride (PVC).

The fibers can be added to the ceramic mixture as weaved mat, short cut fibers, long cut fibers, oriented strands, or simply as cut fibers that are not oriented in any way, or any combination thereof, and are added as 1 to 10 wt. % of the substrate. To obtain fiber loadings above 2 wt. %, fiber to the extent of 2 wt. % must first be added to the binder mixture with subsequent stirring to allow the binder mixture to dissolve, then addition of fiber up to the desired higher wt. % when the mixing slurry becomes thin due to dissolution of the phosphate binder.

The fiber-reinforced ceramic paste can be cast, molded, and used to dip-coat, paint, or spray surfaces, and to cement lateral junctures in oil and gas wells.

Addition of fibers increases the viscosity of the setting slurry making it difficult to pour the slurry into suitable molds. It is easier to dye cast the forms, but dye casting needs a modified Ceramicrete binder. MHP serves this need very well.

Process Detail

A salient feature of the invented process is the ability to produce sequestration matrices, up to 80 weight percent of which is comprised of waste, and without the addition of heat.

In one instance, as much as 73 wt. % powder with 18 wt. % MgO/MHP binder (equimolar amounts of MgO and MHP) and 9 wt. % water is utilized to form a slurry of putty-like consistency. The resultant paste can then be pressed at a pressure of ~1000 pounds per square inch (psi) to form a dense monolith. Initial setting takes place within ten minutes. Alternatively, more water can be added to make a thinner paste or slurry and pour this slurry into a mold. Within an hour, the slurry sets into a hard ceramic.

Boric acid can be added to retard the reaction and reduce the reaction rate. This provides more time to transfer the mixture into the mold and apply pressure for the purpose of compacting the slurry. The iron examples infra are present to serve as illustrations. Other metals can be encapsulated by the invention disclosed herein.

EXAMPLE 1

Pelletizing Steel Industry Waste or Swarfs

Swarfs are machining wastes containing iron in them. These wastes also contain oils and as such, conventional cements cannot be used to solidify them. The presence of metal also makes swarfs unsuitable for encapsulation/incorporation into ceramics generated from a phosphoric acid solution, as disclosed in U.S. Pat. No. 5,830,815, because reaction of metal with phosphoric acid generates large amounts of heat and boils the slurry.

In storage, swarfs oxidize and form magnetite and haematite. While they are pyrophoric wastes and hence are a liability, they are ideal raw materials for forming iron phosphate ceramics. This is because the wastes contain a significant amount of elemental iron that has not rusted, and they also contain different iron oxide forms that include haematite and magnetite. To recover metal values from these wastes, it is necessary that they be pelletized.

Swarf waste powder was pelletized by encapsulation pursuant to the procedure given supra in the "Process Detail" with a swarf waste loading of 73 wt. % in the final dry mixture, the remaining 23 wt. % being the dry mixture described on p. 6. During mixing and pressing, the mixture did not generate heat. Each sample formed was a briquette of dimensions 2"×2"×1", and was placed under pressure for 2 minutes at a pressure of 1000 psi, thus reducing its volume 40%. Each briquette was stored in a polyethylene bag for 3 weeks for complete curing. Within a day all samples appeared hard and were unscratchable, but continued to release water in the bag indicating a continued reaction.

Figure 2:
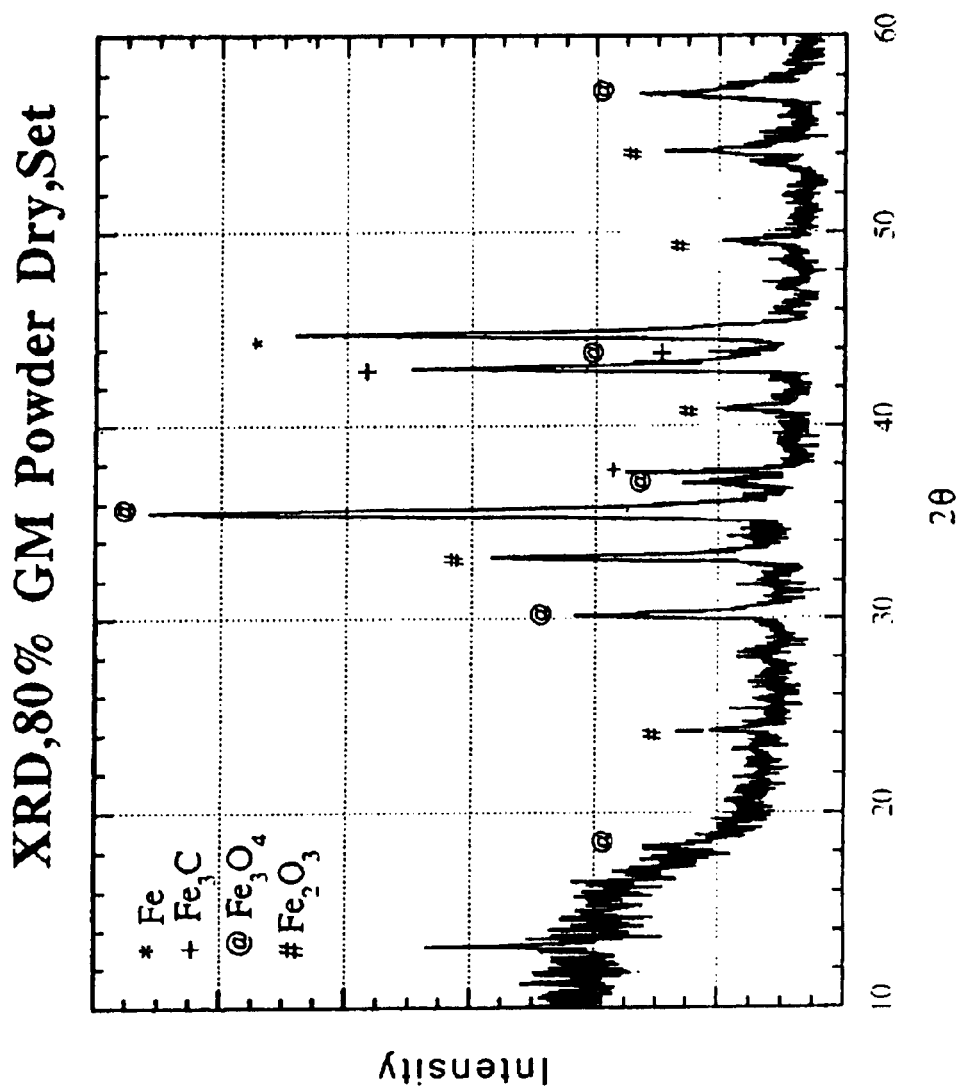
FIG. 2 is a schematic representation of the X-ray diffraction of a swarf after encapsulation, in accordance with features of the present invention.
Figure 3:
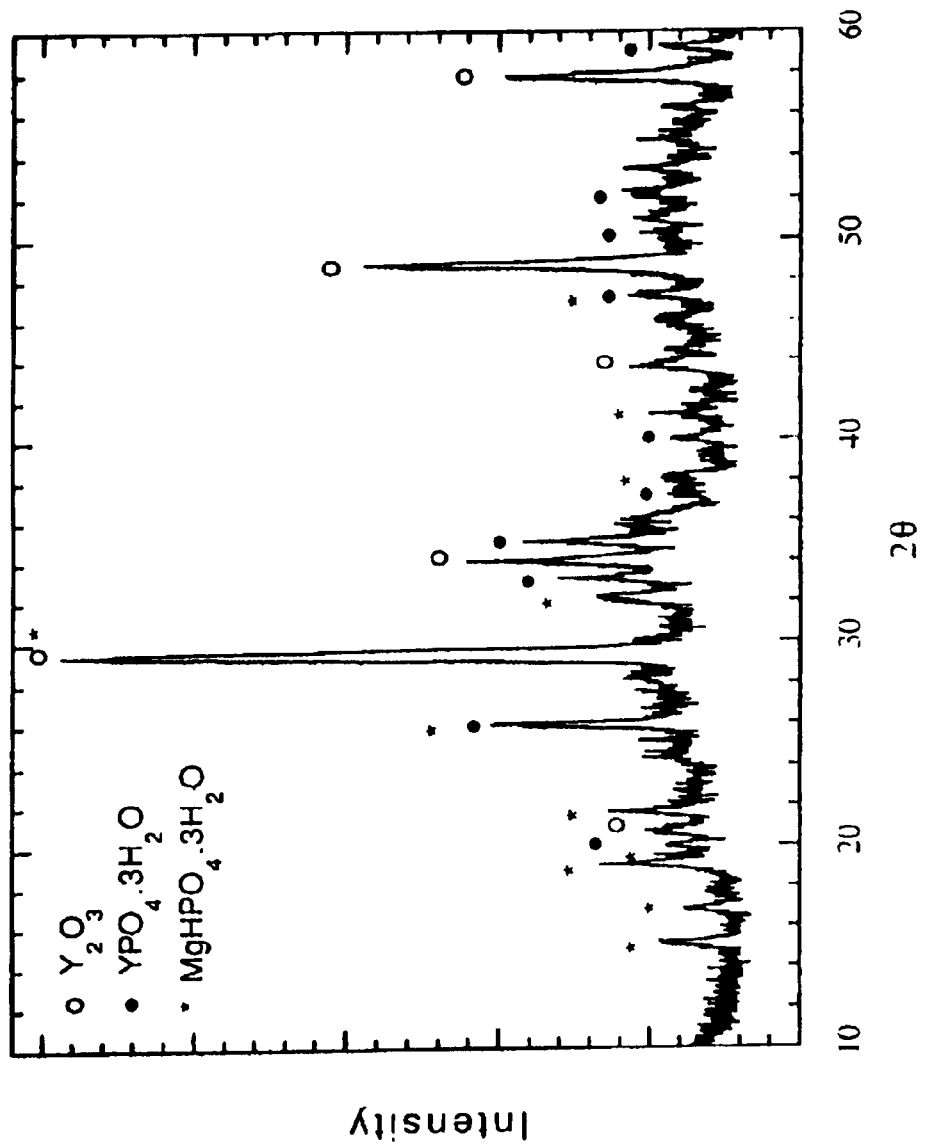
FIG. 3 is a schematic representation of the X-ray diffraction of yttrium phosphate ceramic, in accordance with features of the present invention.

FIG. 2 shows an X-ray diffraction pattern of a typical swarf before encapsulation in ceramic. The diffraction pattern shows that the swarf contains iron (Fe), carbonized iron ($Fe_3C$) and haematite ($Fe_2O_3$) as its main constituents. FIG. 3 shows a typical X-ray diffraction pattern of the encapsulated swarf. Apart from the unreacted haematite ("#"), unreacted iron ("★"), and unreacted carbonized iron ("+"), FIG. 3 discloses the presence of additional compound, magnetite ($Fe_3O_4$), designated as @. Magnetite may form via the reactions according to equations 4 and 5:

$$Fe_2O_3 + Fe + 2e^- \rightarrow 3FeO \quad \text{Eq. 4}$$

$$FeO + Fe_2O_3 \rightarrow Fe_3O_4 \quad \text{Eq. 5}$$

Some of the FeO that forms via the reaction given in Equation 4 may react with MHP to form $FeHPO_4$ according to Equation 6.

$$FeO + Mg(H_2PO_4)_2 \cdot 2H_2O \rightarrow MgHPO_4 \cdot 3H_2O + FeHPO_4 \quad \text{Eq. 6}$$

The water that was added to dissolve the MHP binder does not participate in the reaction, but is released in the polyethylene bag. Thus at the end, 80 wt. % swarf and 20 wt. % binder all reacted to form a hydrophosphate compound. The briquettes' properties are given in TABLE 1.

TABLE 1

Properties of solidified swarf samples.

| Property | Measured values |
|---|---|
| Density (g/cm³) | 2.16 |
| Open Porosity (vol. %) | 10 |
| Compressive strength (psi) | 2345 ± 345 |

Given the fact that the iron content was high in the original swarf material, the density of the briquette is relatively low. The lower than anticipated density is most likely due to the formation of hydrated iron compounds that generally have lower densities. The open porosity of 10% is lower than found in solidified concrete and hence lower water absorption.

The compressive strength of the iron-encapsulating ceramic is very similar to that of conventional bricks (~2000 psi). The samples are hard enough to withstand being dropped from a height of 12 feet onto a hard floor. The data in TABLE 1 clearly shows that the swarf pellets can withstand rough transportation and rough handling. The pellets are also light weight and therefore can easily be picked up by an electromagnet for feeding into blast furnaces, without being broken into pieces.

These observations show that the MHP binder can be very suitable in recycling metal wastes and for stabilizing uranium chips, which have been stored in mineral oils.

The binder metal wastes and radioactive materials are easily incorporated into monolithic waste forms for long-term storage.

EXAMPLE 2

Compacting Ashes

A number of different ashes were used which included high chloride content fly ash, bottom ash and low chloride content Class F fly ash. These ashes were radioactively contaminated chloride-containing ashes from various U.S. Department of Energy (DOE) sites. In each case, a small amount of water was added to moisten the mixture. Briquettes of dimensions 2"×2"×1" were made using these ashes along with the MHP binder. As with the swarf, each sample formed was a briquette of dimensions 2"×2"×1", and was placed under pressure for 2 minutes at a pressure of 1000 psi, thus reducing its volume. Each briquette was stored in a polyethylene bag for 3 weeks. The samples were cured for one full week and were then cut into 1"×1"×1" cubes for which compression strengths were measured. The results of the strength measurements are given in TABLE 2 which also contains results for briquettes made with MKP.

TABLE 2

Compressive strengths of ash briquettes produced with MHP and MKP.

| Wt. % of ash components | | | | |
|---|---|---|---|---|
| High Cl Bottom Ash | High Cl Fly Ash | Low Cl Class Fly Ash | Wt. % of Binder | Compressive Strength (psi) |
| 35 | — | 35 | MHP, 30 | 4421 |
| 50 | — | 20 | MHP, 30 | 3038 |
| 27.5 | 7.5 | 35 | MHP, 30 | 2495 |
| 35 | — | 35 | MKP, 30 | 2402 |
| 50 | — | 20 | MKP, 30 | 2327 |
| 27.5 | — | 35 | MKP, 30 | 1843 |
| — | — | 80 | MHP, 20 | 4056 |
| — | — | 85 | MHP, 15 | 2059 |
| — | — | 90 | MHP, 10 | 600 |

As noted in the last three rows of the table, high waste loadings can be attained with ash of low Cl content. The compressive strengths values are 4056 psi, 2059 psi, and 600 psi for low Cl waste loadings of 80%, 85%, and 90%, respectively. The minimum strength requirement for land disposal of hazardous and radioactive waste is 500 psi.

As a result of compressing the MHP binder briquettes, their volumes decreased by as much as ~40%. The MKP binder briquettes do not undergo any volume reduction whatsoever when compressed. For waste treatment, this compaction reduces disposal costs by 40% which is a distinct advantage over waste encapsulation processes utilizing MKP, and is estimated to be the lowest cost process for treating high volume radioactive waste.

EXAMPLE 3

Yttrium Oxide Containing Waste Forms

Yttrium oxide was thoroughly mixed with pre-mixed MHP dry mixture in a weight ration of 1:2. Water was then added to the powder mixture at a weight ratio of powder to water of 3:1. The resultant slurry, viscosity of 200 cp, was mixed for 15 minutes until it warmed slightly to ~40° C. due to the exothermicity of the process, and subsequently set into a hard ceramic within 10 minutes. As such, the slurry provides an exothermic reaction, which aids in the setting reaction.

The ceramic formed in this $Y_2O_3$ protocol has a density of 1.78 grams per cubic centimeter (g/cc) and its open porosity is ~5% giving the same density-porosity characteristics of MKP binder with various encapsulated wastes. However, because $Y_2O_3$ is less than sparsely soluble, the invented MHP process is the best means to form a ceramic of this oxide and other rare earth oxides with similar solubilities.

FIG. 3 shows a X-ray diffraction pattern of the yttrium phosphate ceramic. In addition to Newberyite ("*"), $Y_2O_3$ ("o"), and yttrium phosphate trihydrate, $YPO_4 \cdot 3H_2O$ ("●") are present.

EXAMPLE 4

Magnetite-Containing Ceramic Waste Forms

Magnetite based ceramics have been made in the past by the direct reaction of magnetite and aqueous phosphoric acid solution. The reaction is rapid and very exothermic which creates difficulties when attempting to form large monoliths. This problem may be overcome by using MHP as the binder.

Magnetite and MHP powder were mixed thoroughly in a weight ratio of 1:2 of magnetite to MHP. Water was added in a weight ratio of 1:3 of water to mixture. The resultant slurry, viscosity of 200 cp, was mixed for ~15 minutes until the mixture's temperature began to increase. The slurry was then poured into molds after which it set within an hour and formed a dense and hard ceramic. The ceramic has a density of 1.71 g/cc and an open porosity of 4.6%. This particular magnetite ceramic is a lightweight material.

Figure 4:
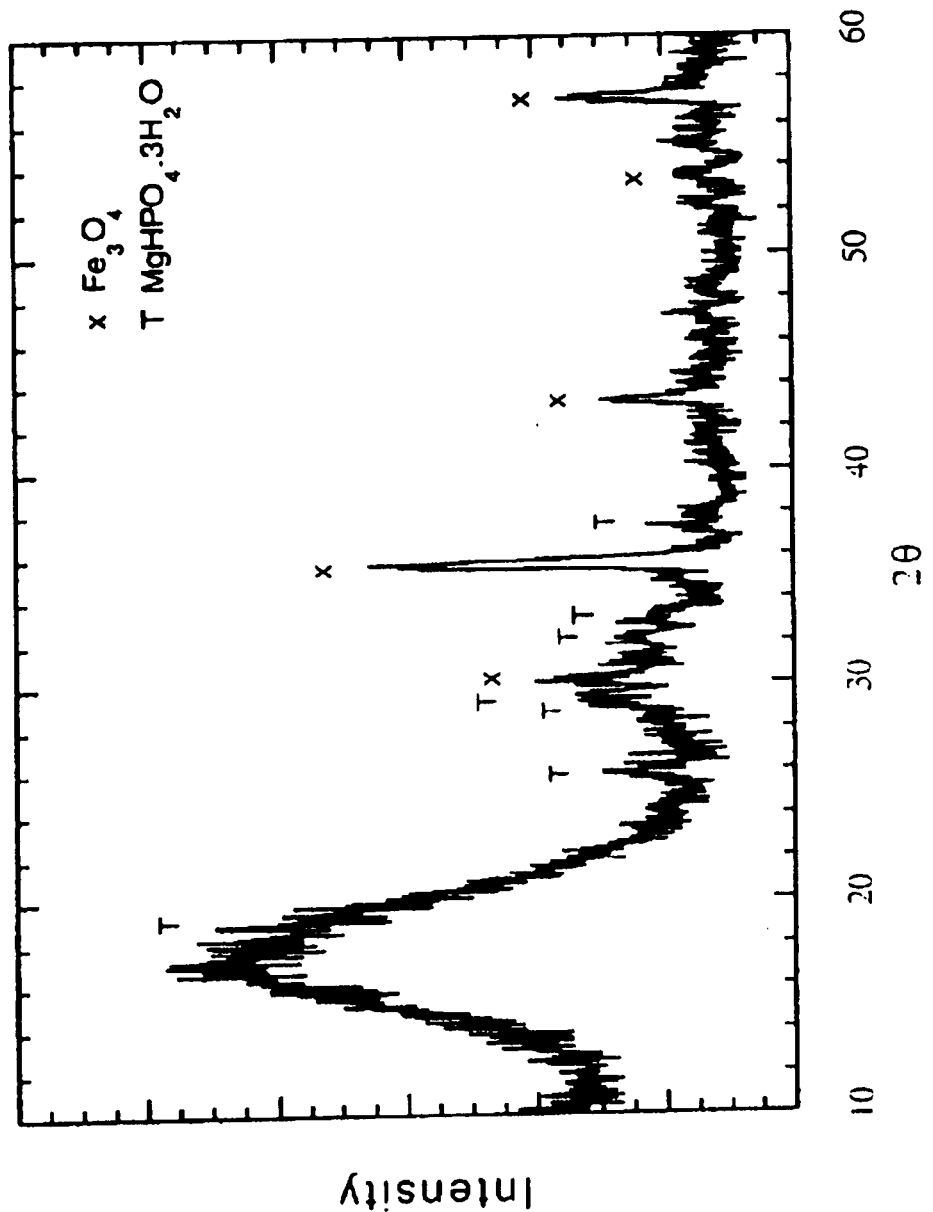
FIG. 4 is a schematic representation of the X-ray diffraction of magnetite phosphate ceramic, in accordance with features of the present invention.

FIG. 4 shows the X-ray diffraction pattern of the ceramic formed. Peaks are directly observed only for $Fe_3O_4$ ("x") and $MgHPO_4 \cdot 3H_2O$ ("T") are seen to be present. Although no peaks of iron phosphate are visible, the large humps indicate a significant amount of a glassy phase. The magnetite ceramic sample also looked very glassy and scanning electron microscopy showed large portions of featureless or glassy material. Thus, the iron phosphate formed an amorphous or glassy solid structure. The solid is free of open porosity with almost zero water absorption.

EXAMPLE 5

Strength Enhancement by Fiber Addition

As taught supra, reinforcing substrates such as fibers may be directly incorporated into the phosphate powders. In this example, the binder powder mixtures comprised magnesium potassium phosphate hexahydrate, and Class F fly ash. Two different chopped glass fiber lengths were used, 0.25 inch and 0.5 inch. Fibers were added into the powder blend in a proportion of 1 to 3 wt. % of the total mixture. Water was added and as the powder dissolved, more fibers could be added, if desired or needed to obtain a particular wt. %. A dye-casting process can be used to form composites with a greater amount of fiber, up to 10 wt. %.

Figure 5:
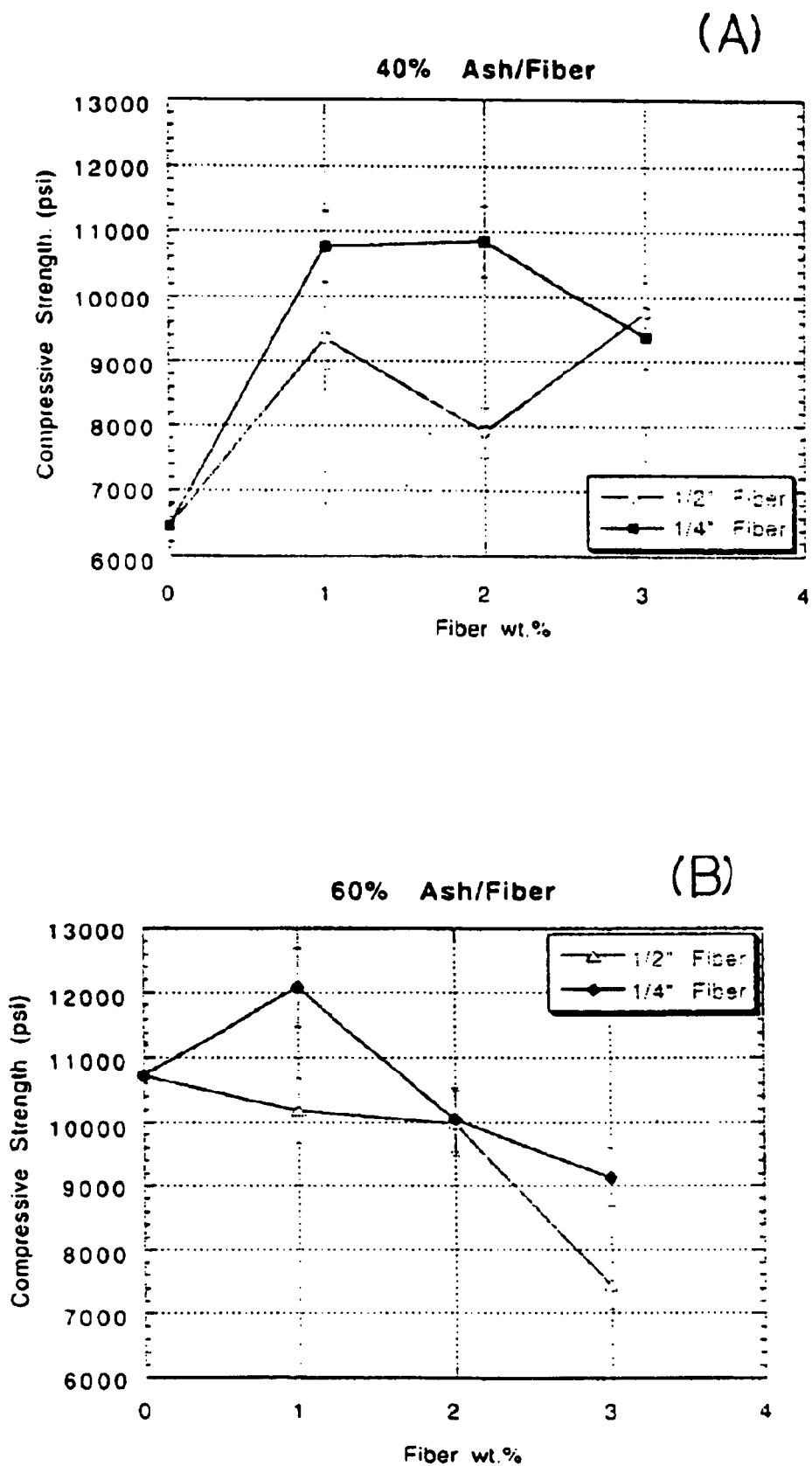
FIGS. 5(a–b) is a schematic representation of compressive strength of fiber-reinforced ceramicrete as a function of fiber content for 40 wt. % ash and 60 wt. % ash composites, in accordance with features of the present invention.

FIGS. 5(a–b) shows the compressive strength as a function of fiber content in composites of 40 and 60 wt. % Class F fly ash with two different fiber lengths. As shown in FIG. 5a, with a waste loading of 40 wt. % ash and loading with 0.25 inch chopped glass fiber, the compressive strength increased, from a value of 6500 psi for MHP binder ceramic without fibers, to 10,800 psi when fiber was added to the extent of 1 and 2 wt. % of the total composite. With a fiber loading of 3 wt. %, the compressive strength decreased to 9,400 psi. The results for 0.5 inch chopped glass fiber were somewhat lower than those for 0.25 inch fiber and dropped to 9800 psi at 3 wt. % fiber.

In the case of 60 wt. % ash, the compressive strength profiles are exactly the opposite of those for 40 wt. % ash, as shown in FIG. 5b. The compressive strength without fiber is 10,600 psi. With 1 wt % of 0.25 inch fiber, the compressive strength is 12,000 psi; then inversely, the compressive strength of the composite with 0.5 inch fibers consistently decreases with increasing fiber content.

Figure 6:
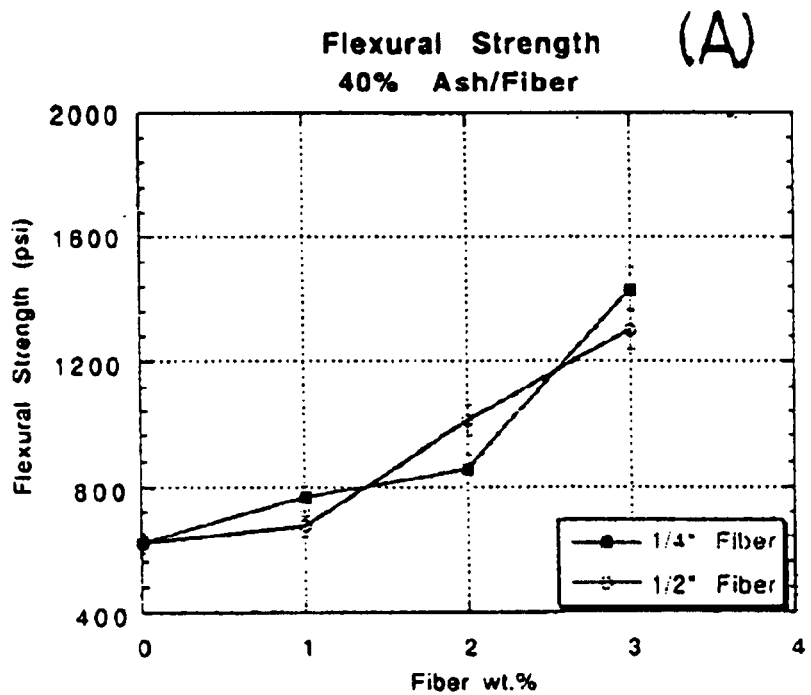
FIGS. 6(a–b). is a schematic representation of flexural strength of fiber-reinforced ceramicrete as a function of fiber content for 40 wt. % ash and 60 wt. % ash composites, in accordance with features of the present invention.
Figure 6:
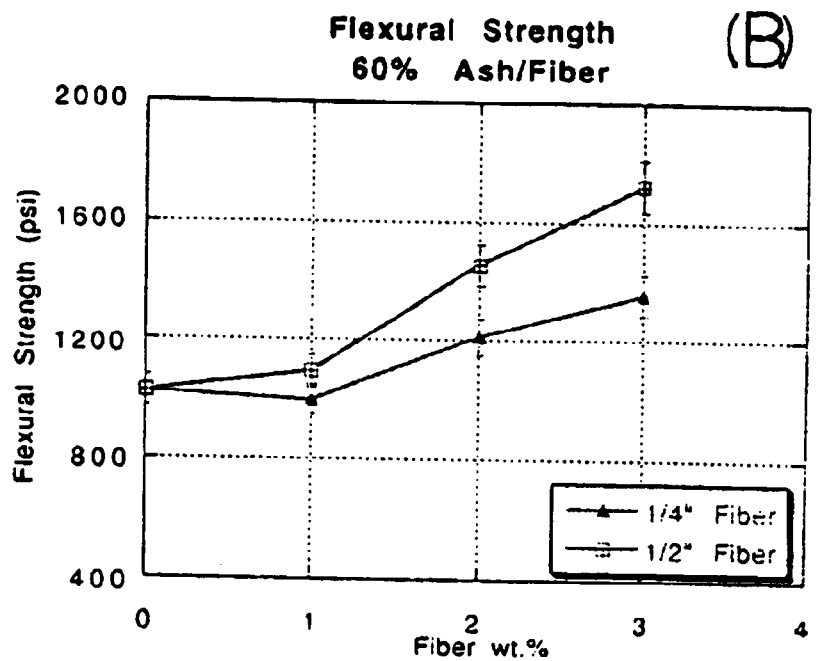

FIGS. 6(a–b) shows the flexural strength as a function of fiber content in composites of 40 wt. % ash and 60 wt. % ash. FIG. 6a shows the results for 40 wt. % ash and FIG. 6b the results for 60 wt. % ash. For both ash wt. %'s and both fiber lengths, flexural strength increases as the fiber wt. % increases.

Figure 7:
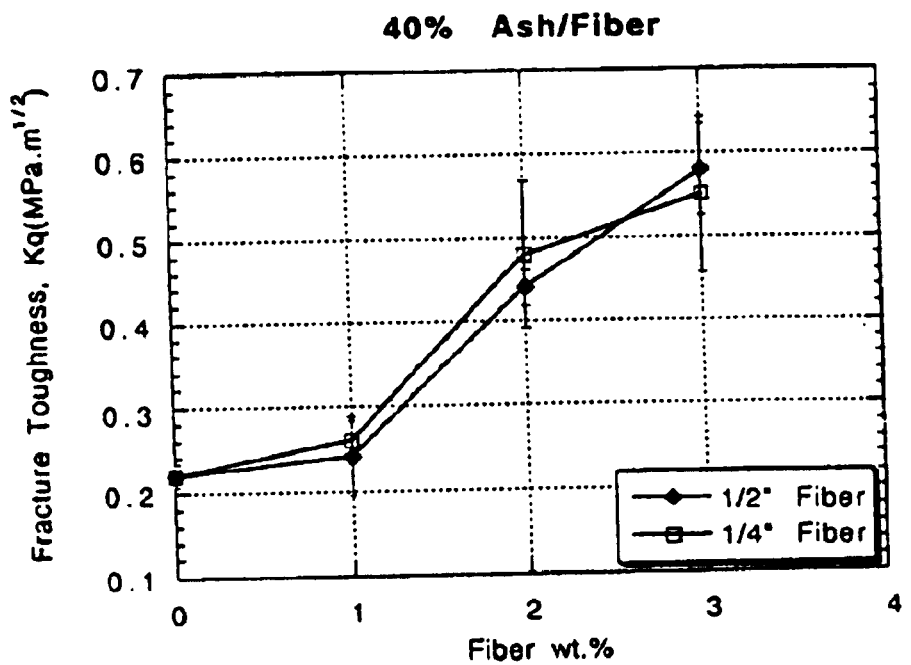
FIGS. 7(a–b) is a schematic representation of fracture toughness of fiber-reinforced ceramicrete as a function of fiber content for 40 wt. % ash and 60 wt. % ash composites, in accordance with features of the present invention.
Figure 7:
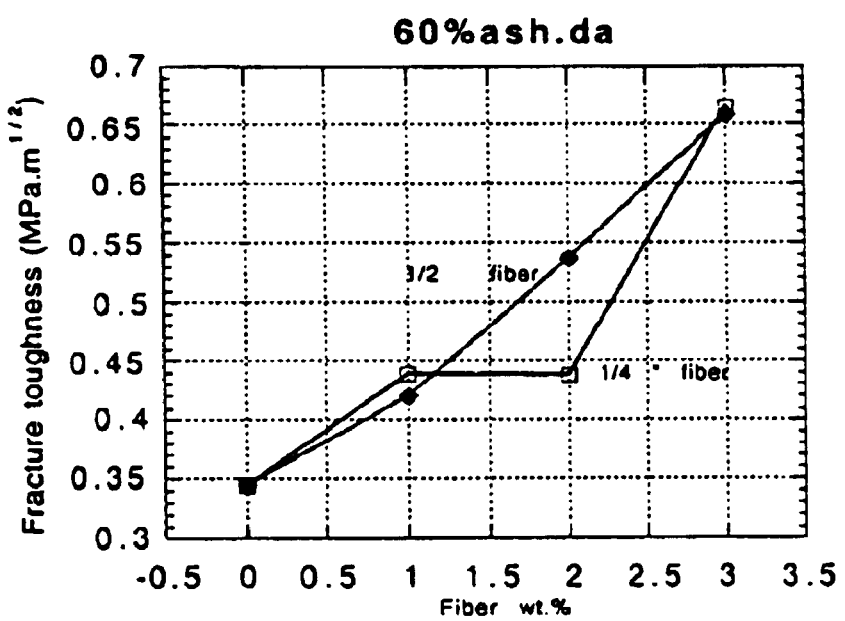

FIGS. 7(a–b) shows the fracture toughness of these same composites. FIG. 7a shows the results for 40 wt. % fiber and FIG. 7b the results for 60 wt. % fiber. The fracture toughness of the ceramicrete samples without any fibers is 0.22 and 0.35 $Mpa \cdot m^{1/2}$. Adding fiber to the extent of 3 wt. % for both 0.25 and 0.5 inch fibers increases the fracture toughness of 40 wt. % ash composite to 0.65 $Mpa \cdot m^{1/2}$. That figure is approximately twice the fracture toughness of MKP formulations, neat, i.e., without any fiber additive.

Figure 8:
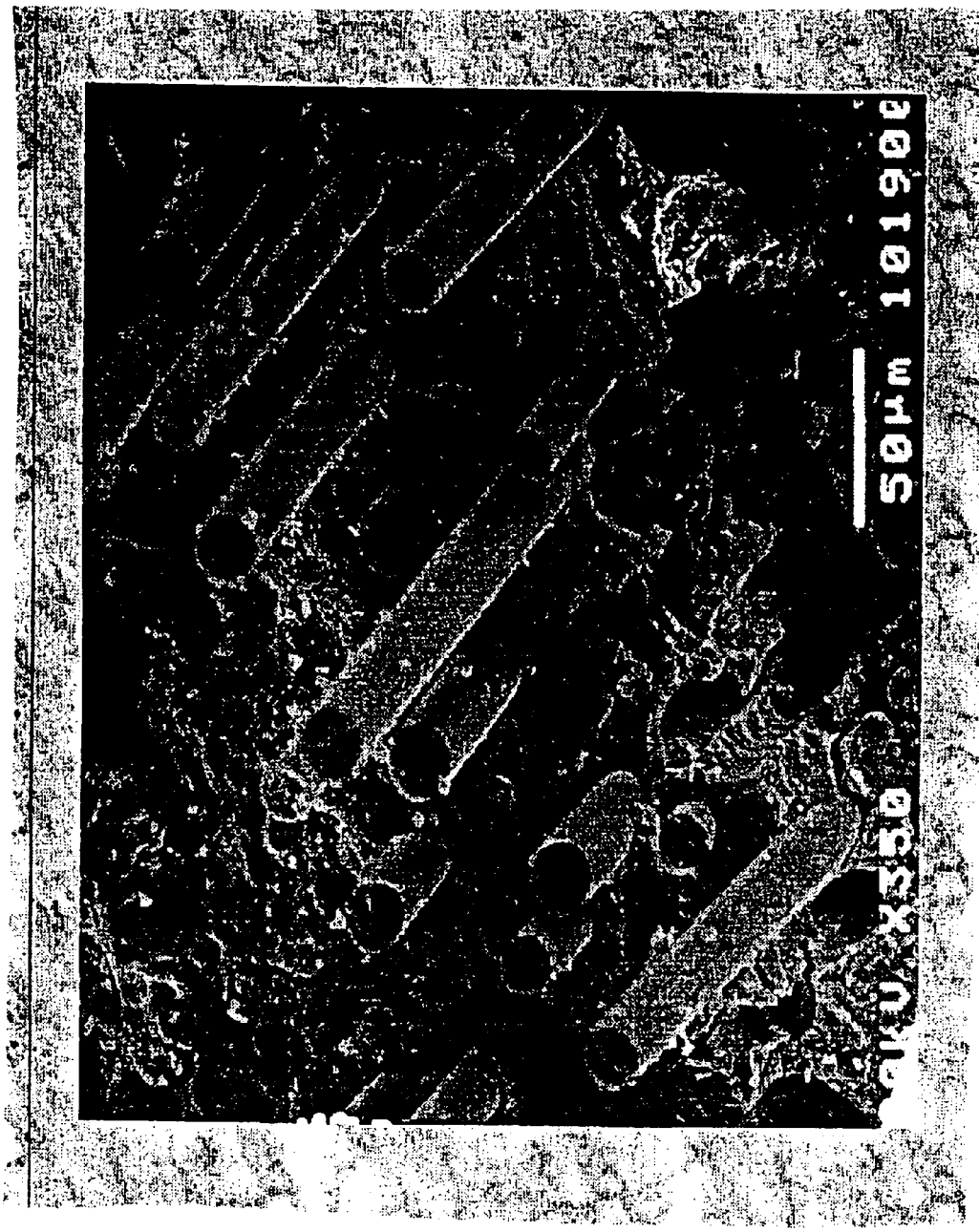
FIG. 8 is a schematic representation of a scanning electron micrograph of a fractured surface of a fiber-reinforced MKP-based ceramicrete, in accordance with features of the present invention.

FIG. 8 shows the scanning electron micrograph of a fractured surface of a MKP-Class F fly ash composite sample, 60 wt. % Class F fly ash and 2 wt. % of 0.25 inch glass fiber. The fibers were added as strands or bunches of fibers; yet, the fibers dispersed and became encapsulated as individual fibers in the ceramicrete matrix. The micrograph clearly shows each fiber is surrounded by the matrix. MKP serves as an effective dispersant. As is to be expected in an acidic or neutral pH environment, there is no corrosion on the fibers' surfaces. This indicates a compatibility between the glass fibers and the matrix.

MKP is a rugged binder, applicable to a wide variety of wastes and for specialized structural products where the strength requirements are very high. On the other hand, MHP allows for high waste loading, is much less expensive, and may be useful for development of structural products of high volume waste streams.

A myriad of wastes can be encapsulated by the invented methods and ceramics. As such, hazardous metals are good candidates, including, but not limited to arsenic, cadmium, chromium, lead, nickel, and zinc. Low solubility-oxides are also good waste substrate candidates, as are fission products, including technetium, strontium, barium and cesium. Low level wastes, such as biomedical materials and other slightly radioactive substrates are suitable encapsulation candidates. Wastes containing difficult to encapsulate oils are particularly good candidates for the instant invention. Even heterogeneous wastes and mixed phase wastes are suitable.

While the invention has been described with reference to details of the illustrated embodiment, these details are not intended to limit the scope of the invention as defined in the appended claims.

What is claimed is:

1. A room temperature process for producing a compactible ceramic from powders, the process comprising:

a) combining MgO, and magnesium dihydrogen phosphate dihydrate to create a homogeneous mixture; and b) contacting the mixture with water to form a slurry wherein the slurry sets within an hour.

2. The process as recited in claim 1 wherein the mixture is mixed with waste powder prior to contacting the mixture with water.

3. The process as recited in claim 2 wherein the waste powder is a high volume waste selected from the group consisting of hazardous wastes, low solubility metal oxides having a $pK_{sp}$ of ~15 to 25, ceramic powders, ashes, red mud, sand, swarfs, lateritic soils, mineral wastes, and the same with traces of oils or greases, or combinations thereof.

4. The process as recited in claim 1 wherein the MgO and the magnesium dihydrogen phosphate dihydrate are present in a molar ratio of MgO to magnesium dihydrogen phosphate dihydrate which varies from 3:7 to 1:1.

5. The process as recited in claim 1 wherein the mixture is present with the water in a weight ratio of from 10:1.85 to 10:3.7.

6. The process as recited in claim 1 wherein the product of the reaction between the MgO and the magnesium dihydrogen phosphate dihydrate is Newberyite, $MgHPO_4.3H_2O$.

7. The process as recited in claim 1 wherein the slurry is reduced in volume to 40% of its original volume.

8. The process as recited in claim 2 wherein the waste powder component comprises up to approximately 85 wt. % of the ceramic.

9. The process as recited in claim 1 wherein the process is carried out without the addition of heat.

10. A ceramic produced from the process recited in claim 1.

11. The ceramic as recited in claim 7 wherein the slurry is compacted at temperatures between 0 and 30° C.

12. A process for strengthening phosphate-based ceramics, the process comprising adding fibers to the initial ceramic mixture, containing magnesium dihydrogen phosphate dihydrate, to create a homogeneous composite substrate, wherein the substrate sets within an hour.

13. The process as recited in claim 12 wherein the fibers are 1 to 10 wt. % of the substrate.

14. The process as recited in claim 12 wherein the ceramic has an acidic to neutral environment.

15. The process as recited in claim 12 wherein the ceramic producing mixture contains a dispersant.

16. The process as recited in claim 15 wherein the dispersant is monopotassium phosphate added to the initial phosphate binder-waste mixture up to 10 wt. % of the initial mixture as a dispersant.

17. A ceramic produced from the process recited in claim 12.

18. A ceramic produced from the process recited in claim 16.

19. A ceramic produced form the process recited in claim 1 which has an amorphous or glassy solid structure.

20. The process as recited in claim 1 wherein the process occurs in acidic environs.

21. The process as recited in claim 12 wherein the process occurs in acidic environs.

* * * * *